United States Patent [19]
Turchi et al.

[11] 4,140,057
[45] Feb. 20, 1979

[54] AXISYMMETRIC STABILIZED LINER IMPLOSION SYSTEM

[75] Inventors: Peter J. Turchi, Alexandria; Daniel J. Jenkins, Vienna, both of Va.

[73] Assignee: The United States of America as represented by the Secretary of the Navy, Washington, D.C.

[21] Appl. No.: 902,196

[22] Filed: May 2, 1978

[51] Int. Cl.$^2$ ............................ F42B 3/00; G21B 1/00
[52] U.S. Cl. ............................ 102/22 R; 102/DIG. 2; 176/1; 310/10; 313/161; 315/111.6
[58] Field of Search ...................... 176/1, 3; 313/231.3, 313/231.4, 161; 315/111.4, 111.5, 111.7; 310/10, 11, 166; 102/DIG. 2, 22

[56] References Cited
U.S. PATENT DOCUMENTS

2,990,485  6/1961  Lee ......................................... 310/11

FOREIGN PATENT DOCUMENTS

2431593  6/1975  Fed. Rep. of Germany ........ 313/231.3

OTHER PUBLICATIONS

Sixth Symposium on Engineering Problems of Fusion Research, Nov. 18–21, 1975, pp. 983–987, Turchi et al.
Nuclear Fusion, vol. 16, No. 5, 11/76, pp. 791–796.

*Primary Examiner*—Harvey E. Behrend
*Attorney, Agent, or Firm*—R. S. Sciascia; Philip Schneider; William C. Daubenspeck

[57] ABSTRACT

A payload (e.g., a plasma, gas, magnetic field) having an initial energy density is confined within an implosion chamber which also contains a rotating liquid liner having an approximately cylindrical inner surface due to the rotational forces. An annular piston, disposed in the implosion chamber, is free to move parallel to the axis of rotation and has a surface in contact with a portion of the rotating liner. Motion of the piston against the liner (due to a pulsed external driving means) causes the inner surface of the liner to implode radially in said implosion chamber, thereby compressing the initial energy density to a higher energy density. The inner surface of the liner remains stable throughout compression due to the rotation of the liner. The other surfaces of the liner are stabilized by contact with the implosion chamber or the piston. After peak compression, the inner surface of the liner is forced (by the high energy density confined within the liner) radially outward toward its initial position, thereby driving the annular piston toward its initial position and returning energy to the external driving means. An embodiment using a plurality of annular pistons to provide an implosion chamber of arbitrary length is also disclosed.

9 Claims, 5 Drawing Figures

AXISYMMETRIC STABILIZED LINER IMPLOSION SYSTEM

BACKGROUND OF THE INVENTION

This invention relates in general to the use of imploding liners to achieve high energy densities and, more particularly, to apparatus for providing repetitive, stabilized implosions of liquid liners.

The use of imploding liners to achieve high energy densities from less extreme energy densities is well known. In the typical imploding liner compression system, a payload of relatively low energy density is confined in the bore of a cylindrical liner which is then caused to implode radially. During the implosion, the kinetic energy of the liner is converted by adiabatic compression to the internal energy of the confined payload which it surrounds.

The basic problem with earlier implosion systems was that operation resulted in the destruction of the apparatus, at least locally, and thus they were not well suited for repetitive applications. Two aspects of the previous implosion system operation introduced difficulties: (1) the use of explosives to impart high kinetic energy to the liner; and (2) the uncontrolled dynamics of the liner material before, during, and after peak compression. The former condition is largely historical, but is related to the need for high pressures at the outside surface of the liner to obtain high inner-surface speeds if the change in inner-surface radius during implosion is not large ($r_{initial}/r_{final} \lesssim 10$). The use of explosive detonation-drive generally requires the destruction of the apparatus. This problem may be eliminated by using non-explosive driving systems such as capacitor banks or high-pressure gases.

Difficulties in controlling the liner dynamics derive largely from mechanical instabilities, such s Rayleigh-Taylor instability, that are associated with the motion of the liner. For example, a basic hydrodynamic instability occurs when the interface between two fluids of different mass density accelerates in the direction of the heavier fluid (Rayleigh-Taylor instability). Thus, when the liner accelerates inward, its rear surface can be disrupted; and when the inner surface is decelerated in compressing the low mass-density payload (plasma and/or magnetic field, for example) it also will be disrupted. The reexpansion of the liner after peak compression is also subject to instability as the liner is slowed by the external driving fluid (gas or magnetic field). All told then, an initially well-defined fluid shape (cylindrical shell) will return to its original position with gross distortions and localized regions of high kinetic-energy density. This disruption of the liner will result in damage to the apparatus and prevent repetitive operation.

Recently, however large radial-compression-ratio liner implosions have been demonstrated using nondestructive techniques. See P. J. Turchi and A. E. Robson, Proc. of Sixth Symposium on Engineering Problems of Fusion Research, San Diego, Cal., Nov. 18–21, 1975 IEEE Publication No. 75CH1097-5-NPS. p. 983. This approach introduced the concept of rotationally-stabilized liquid metal liners accelerated with radially-displaced free pistons as a means of controlling the liner dynamics. During acceleration, the liner was stabilized on its outer surface by the pistons and on the inner surface by the centripetal acceleration due to the rotation of the liner. The application of stiff, radially-displaced free-pistons to the outer surface prohibits the growth of high-frequency Rayleigh-Taylor instabilities, but does not, however, restrict the growth of lower-frequency modes. Such growth results in variations in free-piston positions and in a non-uniform, asymmetric distribution of fluid mass and momentum. Indeed, variations in piston position and low-mode-number asymmetries of liner mass distribution have been observed in experiments with rotating liners driven by a plurality of radially-displaced pistons. The combination of this basic hydrodynamic instability with other factors, such as variations in reaction to Coriolis forces on the radially-moving pistons in the rotating cylinder block, and reliability considerations of the statistically large piston numbers, indicates the need for synchronizing mechanisms to insure the uniformity of the liner implosion. With radially-moving pistons, a concatenation of individual mechanisms, such as gears, cams, tie-rods, valves, etc., would be needed to couple the piston motions. The number of moving parts in the system would increase as some multiple of the number of pistons.

SUMMARY OF THE INVENTION

The present invention is an improvement on this previous work. It provides a stailized rotating-liner implosion system having an axisymmetric piston arrangement which has several advantages over the radially-displaced pistons of the previous work. The approach of the present invention is to create a rotating, hollow, liquid liner having an approximately cylindrical inner surface in an implosion chamber. The liquid is in contact with an annular, axisymmetric (symmetric with respect to the axis of rotation of the rotating liner), stiff piston which is free to move parallel to the axis of rotation of the liner in an annular channel surrounding the implosion chamber. A pulsed magnetic field or high-pressure gas is used to drive the piston against the outer surface of the liner, forcing the inner surface of the rotating liner radially-inward and compressing a payload confined in the implosion chamber. The energy of the driving pressure (or field) is thereby converted to the kinetic energy of the imploding liner and then to the internal energy of the payload. After peak compression, the outward motion of the liner forces the piston back to its original position. The kinetic energy of the liner is thereby returned to the driver energy and the system is ready for the next implosion-reexpansion cycle.

DESCRIPTION OF THE ILLUSTRATIVE EMBODIMENT

To understand the present invention and its advantages, a more detailed description of the prior-art liner implosion system presented in the previously cited article by Turchi and Robson is beneficial. The most obvious problem in controlling liner dynamics involves the growth of hydrodynamic perturbations on the inner surface of the liner as it decelerates during adiabatic compression of the payload (a plasma confined in a magnetic field, for example). Since compression and efficient energy transfer are fundamental to the imploding liner approach, such deceleration must occur, and Rayleigh-Taylor instabilities should therefore be expected to destroy the interior plasma. However, as disclosed by Turchi and Robson, if the inner surface is rotating about its cylindrical axis, the centripetal acceleration, $-V_\theta^2/r$, can offset the radial deceleration, r, to reverse effective acceleration at the interface $(r - V_\theta^2/r)$ in favor of stability. (r is the radius of the inner surface of the liner and $V_\theta$ is the angular velocity at the inner surface.)

While rotation can be expected to stabilize the gross hydrodynamic motion of the inner surface of the liner, allowing a nearly reversible transfer of energy from liner kinetic energy to plasma/field energy and back into liner kinetic energy, this energy would result in severe damage to the driving system if the liner material were allowed to rebound freely after turn-around. For repetitive operations, it is therefore necessary to decelerate the returning liner and, in fact, to recoup its kinetic energy for use in subsequent liner implosion. Such deceleration of a liquid, however, can again result in Rayleigh-Taylor instabilities, this time on the outer surface of the liner, if the decelerating mechanism involves an unfavorable density gradient at the fluid boundary (for example, when the liner is accelerated initially by a gas or magnetic pressure). Indeed, the original inward acceleration of the fluid will suffer from these same instabilities. Rotation is not useful now because of the direction of the acceleration vector, so recourse must be made to other techniques.

Figure 1A:
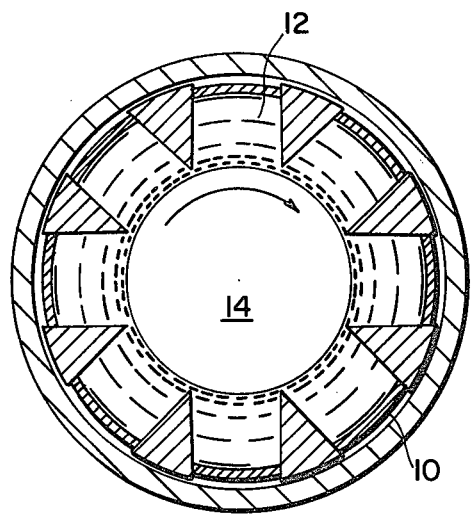
FIGS. 1a and 1b illustrate the prior-art liquid liner implosion system in the umimploded and imploded state, respectively.
Figure 1B:
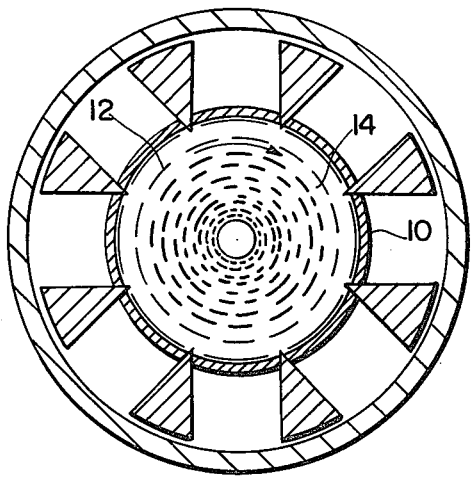

To eliminate the Rayleigh-Taylor instability at the free outer surface, Turchi and Robson suggested that the free outer surface itself be eliminated. The liner would be driven by free-pistons in continuous contact with the liquid liner, with the pistons providing a stiff interface between the high-density liquid liner and a low-density fluid drive, such as high-pressure gas. As shown in FIGS. 1a and 1b, which are schematic cross-sectional views along the axis of rotation of their implosion system in the unimploded state and imploded state, respectively, a plurality of free-pistons 10 are displaced radially inward to inject a captive liner liquid 12 into a central implosion chamber 14. As noted earlier, variations in the free-piston positions results in an undesirable non-uniform, asymmetric distribution of fluid mass and momentum.

Figure 2:
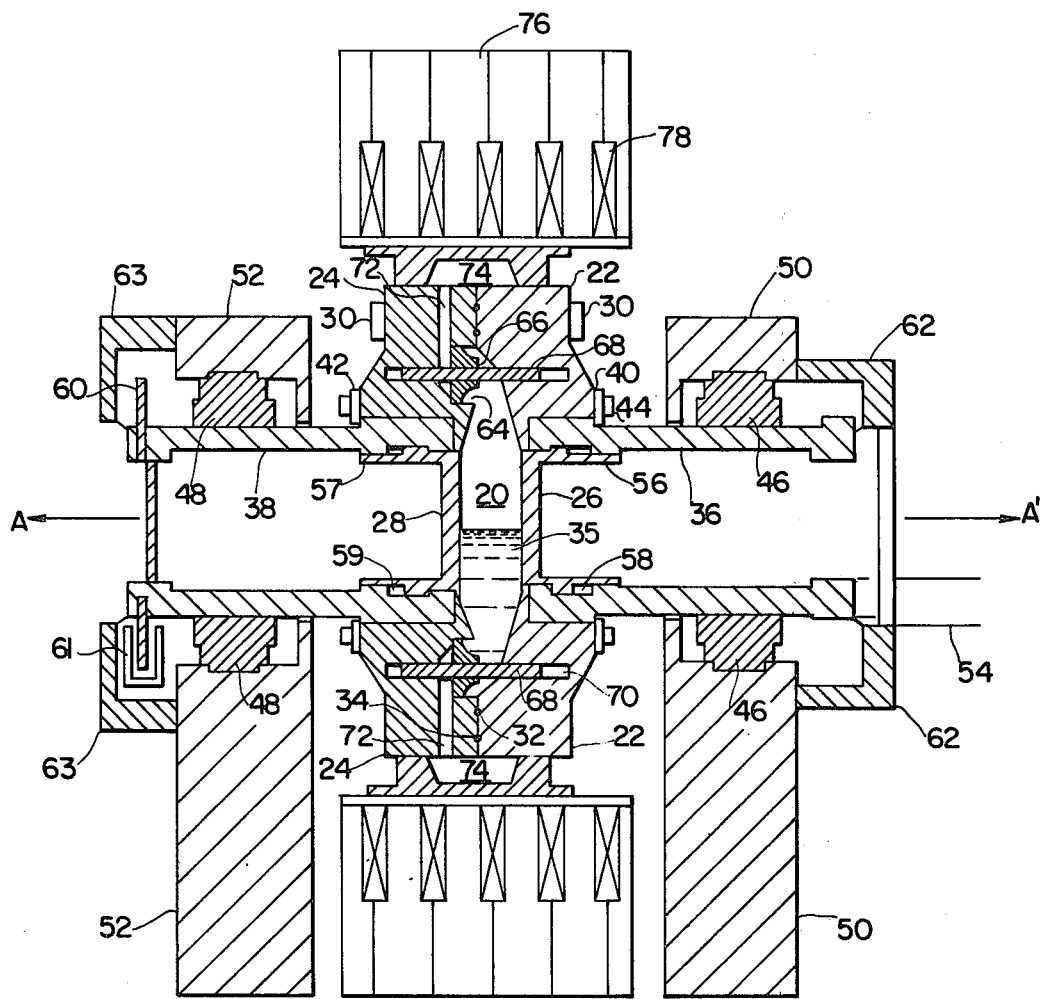
FIG. 2 is a cross-sectional view of a stabilized liner implosion system according to the present invention.

Referring now to FIG. 2, there is shown a cross-sectional view of an illustrative embodiment of a rotating, liquid-liner implosion system in the manner of the present invention. This embodiment was designed for experimental studies and thus contains features to permit the observation of the operation of the device. As will be apparent to a person skilled in the art, the specific structure of a device according to the present invention will be determined by the particular application of interest. For example, using electrically conducting liners, pulsed high magnetic fields can be created, fusion plasmas can be created and confined, and charged-particle rings can be compressed to high particle and total energies. Other similar applications requiring high energy density may be served by this implosion technique. In the illustrative embodiment, an implosion chamber 20 is formed by two annular rotor plates 22 and 24 and two optically transparent endwalls 26 and 28. The annular rotor plates 22 and 24 are secured together by a plurality of bolts 30 with O-ring seals 32 and 34 providing high-pressure fluid seals at the interface where the rotor plates are joined.

A liner liquid 35 (shown as positioned when the implosion chamber is not rotating) is confined in the implosion chamber 20. The liner liquid may be established in the chamber by various means and may be of various materials depending on the application of interest.

In order that the implosion chamber may be rotated, the rotor plates 22 and 24 are secured to hollow shafts 36 and 38 by interference fit and by rings 40 and 42, secured by a plurality of screw bolts 44. The hollow shafts 36 and 38 are supported by and are rotatable on journal bearings 46 and 48 which are in turn supported by bearing mounts 50 and 52, respectively. A drive shaft 54, coupled by offset gears (not shown) to the outside end of hollow shaft 36, and driven by suitable means (not shown), provides offset drive to rotate the implosion chamber 20 about the axis indicated by line A–A'. It is noted that the hollow characteristic of the shafts 36 and 38, the transparency of the end plates 26 and 28, and the offset drive feature permit visual observation of the central implosion chamber.

Since the device undergoes significant stress during the implosion-reexpansion circle, the embodiment of FIG. 2 contains features to avoid damage to the device due to this stress. The endwalls 26 and 28 of the implosion chamber are supported by cylindrical blocks 56 and 57 which are allowed to move along the axis of rotation against orificed-chambers 58 and 59 to provide shock-absorber action during implosion of the liner. This avoids damage to the endwalls 26 and 28 and rotor plates 22 and 24 due to pulsed axial loadings which arise when the inner surface of the liner is stopped at peak compression. An annular plate 60, fixed to the outside end of shaft 38, is coupled to a thrust bearing 61 which serves to further absorb axial loading of the device due to the axial displacement of the annular piston 66 (as will be described hereinafter). Bearing housings 62 and 63 provide housing for the lubricants associated with the journal bearings and the thrust bearings.

Figure 3:
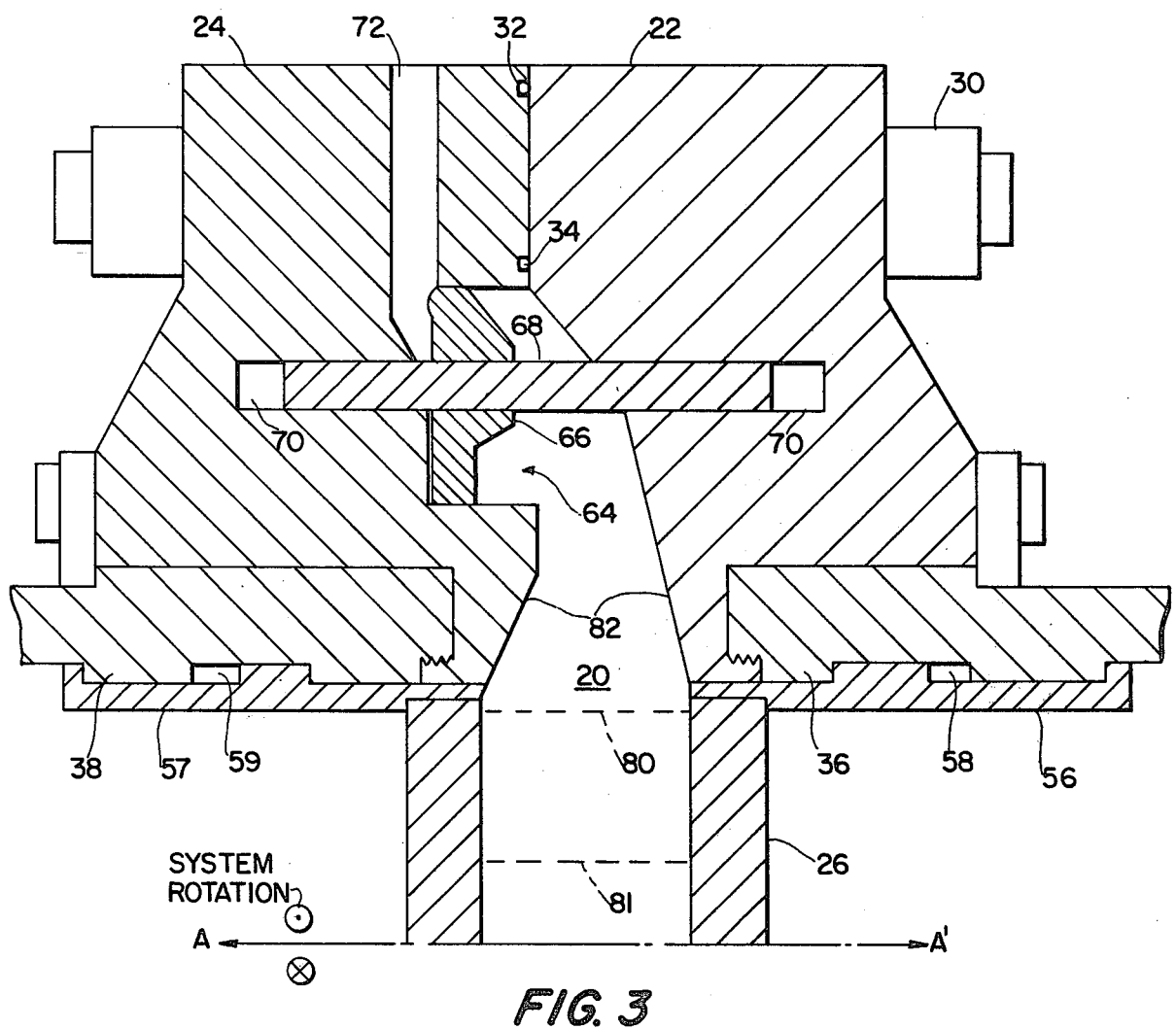
FIG. 3 is an enlarged view of a portion of the cross-sectional view of FIG. 2.

As best seen in FIG. 3 which is an enlarged view of the upper portion of the implosion chamber of FIG. 2, the inside walls of the rotor plates 22 and 24 (i.e., the walls that define a portion of the implosion chamber 20) are shaped to form an annular channel 64 surrounding the central portion of the implosion chamber. An axisymmetric annular free-piston 66 is disposed in the annular channel 64. The annular piston 66 is affixed to a plurality of rods 68 which are slidably disposed in bores 70 in the rotor plates and is free to move axially (indirection A–A') within the constraint of the annular channel 64 and bores 70.

The annular free-piston 66 may be displaced axially by high-pressure gas that is supplied through a plurality of high-conductance holes 72 in rotor plate 24 from a plenum 74 (not shown in FIG. 3, see FIG. 2) which encircles the rotor plates. The plenum 74, which is separated from the rotatable implosion chamber by flexible seals (not shown) that restrict pulsed-gas escape during the implosion-expansion cycle, is supported by an encircling set of support plates 76. For some applications it may be useful to rotate the plenum with the liner instead rotating the liner within a stationary plenum; similarly, it may be useful in some applications to rotate only the liner material with the pistons, plenum and chamber held fixed. In this embodiment, the support plates 76 also hold coils 78 for creating an initial magnetic field (the payload) in the implosion chamber 20. It will be recognized that the technique of establishing the initial payload (be it a gas, a plasma, an ion ring, etc.) will depend on the particular payload and the particular application. Therefore the initial payload may be established by various means within the concept of the present invention.

In operation of the present example, a rotating hollow cylinder of liquid (the liner material) is created in the implosion chamber by rotation of the implosion chamber about axis A-A'. To a good approximation, the inner surface (indicated by dashed line 80 in FIG. 3) in the unimploded state will be a right circular cylinder. The outer surface of the liquid will assume a shape defined by the implosion chamber side walls 82 and the surface of the piston 66 which contacts a portion of the liquid. Motion of the annular free-piston 66 against the liquid, parallel to the axis of rotation of the implosion chamber 20, forces the inner surface of the liquid cylinder radially inward (to a position indicated by dashed line 81, for example). In the illustrative embodiment, the axial displacement of the annular piston 66 is produced by pulses of high-pressure gas against the piston. Those skilled in the art will recognize that other methods such as the use of pulsed magnetic fields may be used to drive the free piston. By conservation of angular momentum, the azimuthal speed of the inner surface increases as its radius decreases, such that at minimum radius (turn-around), the centripetal acceleration exceeds the radial acceleration of the liner by some margin. This eliminates the Raleigh-Taylor instability at the inner surface of the liner, allowing the kinetic energy of the liner to be transformed to the internal energy of the payload (a plasma, a gas, a magnetic field created by coils 78, etc.) confined in the implosion chamber without disruption of the surface.

Since the instability is prevented, the exchange of energy between liner and payload is very nearly reversible (viscous effects are quite modest). The internal energy of the payload, along with the rotational energy of the liquid liner, can thus be converted back into kinetic energy of the outward liner motion after peak compression. The outward motion of the liner forces the piston back to its original position, thereby recompressing the gas (or magnetic field) that caused the liner to implode initially. With the kinetic energy of the liner returned to the driver gas (or magnetic field) energy, the system is ready for further implosion-expansion events, either in continuing free-cycles or intermittent duty (in which the transfer from stored energy to liner kinetic energy maybe controlled by a value or latch). Note that the transfer of energy at the outer boundary of the liquid liner during both the initial inward acceleration and the subsequent deceleration of the returning liner is accomplished stably because the accelerating surface is in direct contact with the stiff piston.

Figure 4:
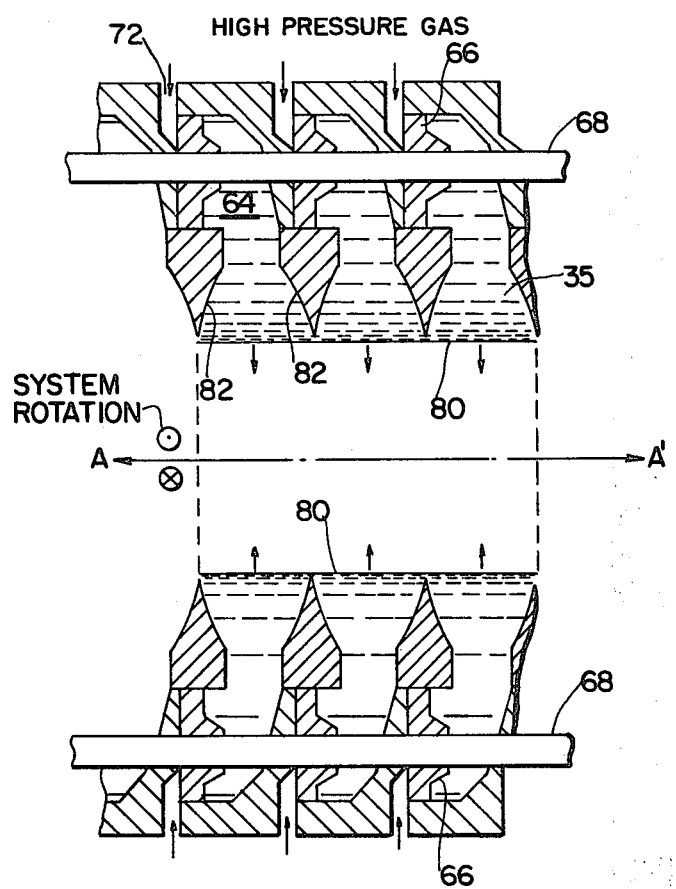
FIG. 4 illustrates how the present invention may provide an implosion chamber of arbitrary length.

FIG. 4 is a partial cross-sectional view of a series of annular free-pistons 66 disposed in an implosion chamber which illustrates how the motion of a plurality of annular pistons can be rigidly linked to provide an implosion chamber of arbitrary length according to the present invention. The plurality of annular free-pistons 66 are disposed in annular channels 64 and are guided within the annular channels by a plurality of axially distributed connecting rods 68. Each piston in the system is individually driven by high-pressure gas that is supplied from a surrounding plenum (not shown). Since the annular pistons are rigidly connected (although individually driven) complete synchronism of their motion is accomplished. Thus a single moving piston is in effect created from a series of distributed piston surfaces, avoiding stress limitations which may occur in a long device which is driven from the ends. It will be recognized by those skilled in the art that coupling the axial motions of a plurality of annular piston can be accomplish as just described or by various other means such as cams and gears, or by active or passive feedback on the driver action. For example, two opposing annular pistons driven by separate gas plenums is a suitable means for attaining axisymmetric implosions as contemplated by the present invention.

Inherent in the use of an axially-displaced annular piston to produce a radial implosion is the requirement that the liquid be turned 90° with low pressure drop and with minimum distortion in the free surface (inner surface) of the liner. It is noted that the detailed shape of the inner surface of the liner and the trajectory at which the liner implosion occurs can be controlled by altering the shape of the liquid-flow channel by changing the shape of the side walls 82. For example, in some applications, it may be desirable to control the shape of the inner surface so that liner implodes more quickly at the ends of the implosion chamber so that the liner effectively cups the payload.

In addition to providing an azimuthally symmetric flow field allowing very high quality implosions and simple coupling of several pistons, the axial displacement of the axially symmetric, annular pistons parallel to the rotational axis of the system (and, generally, the magnetic axis also) avoids coriolis forces which are present when the motion of a piston is radially directed. Also eddy currents, which are induced by motion across magnetic field lines in the plane containing the system axis, are closed within the annular piston instead of across the boundary between a moving piston and its guiding channel as in the case of a radially-displaced piston.

It will be recognized that an implosion system according to the present invention can be constructed from almost any material used in standard machinery that has the necessary strength, rigidity, porosity, etc, as determined by the particular application of interest. For example, in the case of a small laboratory model, the system used a rotating gas-plenum of aluminum, an annular piston of nylon, and an implosion chamber of aluminum and plexiglas. This system is operated with driving pressure up to 500 psi using liners of water compressing trapped air. Systems have been designed to operate with driving pressures of 5000 psi, and using liners of sodium-potassium alloy to compress an inert trapped-gas payload and/or magnetic flux up to pressures of 150,000 psi. The materials in the case are nonmagnetic stainless steel for the piston carriage, aluminum for the piston, and aluminum for the implosion chamber. Many other choices of materials for both the liner and the implosion system are possible based on standard mechanical engineering design practices.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A stabilized liner implosion system for compression of a payload which comprises:

means for providing an implosion chamber in which said payload is confined:
a liquid liner confined in said implosion chamber;
means for rotating the liquid liner to form a hollow liquid body having a stable inner surface, said payload being inside said hollow body;
a piston, annular with respect to the axis of rotation, disposed in said implosion chamber, said piston being free to move parallel to the axis of rotation of the liquid liner, a surface of said piston being in contact with a portion of the liquid liner;
means for driving said piston against the portion of the liquid liner in contact with said piston, the displacement of said piston forcing the inner surface of the liquid liner to implode toward the axis of rotation of the implosion chamber thereby compressing said payload,
whereby the energy of said means for driving may be converted to the kinetic energy of the liquid liner and then to the internal energy of said payload and
whereby, after peak compression of the payload, the internal energy of the payload may be converted to the kinetic energy of the liquid liner and then to the energy of said driving means.

2. The stabilized liner implosion system as recited in claim 1 wherein said means for rotating said liquid liner comprises:
means for rotating said means for providing an implosion chamber.

3. The system of claim 1 wherein said annular piston is symmetrical with respect to the axis of rotation of said liquid liner.

4. The stabilized liner implosion system as recited in claim 1 wherein said implosion chamber has an annular channel in which said annular piston is disposed.

5. The stabilized liner implosion system as recited in claim 1 wherein said means for driving said piston is a high-pressure gas.

6. A stabilized liner implosion system for compression of a payload which comprises:
means for providing an implosion chamber in which said payload is confined;
a liquid liner confined in said implosion chamber;
means for rotating the liquid liner to form a hollow liquid body having a stable inner surface, said payload being inside said hollow body;
a plurality of spaced pistons, annular with respect to the axis of rotation, disposed in said implosion chamber, each of said plurality of pistons being free to move parallel to the axis of rotation of the liquid liner, a surface of each of said plurality of pistons being in contact with a portion of the liquid liner.
means for connecting said plurality of pistons so that the motion of said pistons is synchronous;
means for driving said plurality of pistons against the portion of the liquid liner in contact with each piston, the displacement of said plurality of pistons forcing the inner surface of the liquid liner to implode toward the axis of rotation of said implosion chamber thereby compressing the payload,
whereby the energy of said means for driving may be converted to the kinetic energy of the liquid liner and then to the internal energy of said payload and
whereby, after peak compression of the payload, the internal energy of the payload may be converted to the kinetic energy of the liquid liner and then to the energy of said driving means.

7. The stabilized liner implosion system as recited in claim 6 wherein said means for rotating said liquid liner comprises:
means for rotating said means for providing an implosion chamber.

8. The stabilized liner implosion system as recited in claim 6 wherein said implosion chamber has a plurality of annular channels in which said plurality of annular pistons are disposed.

9. The stabilized liner implosion system as recited in claim 6 wherein each of said plurality of pistons is individually driven by said means for driving.

* * * * *